(12) United States Patent  
Gerstel et al.

(10) Patent No.: US 8,743,679 B2
(45) Date of Patent: Jun. 3, 2014

(54) CLIENT DIVERSITY POLICY SHARING WITH THE TRANSPORT LAYER

(75) Inventors: Ornan Gerstel, Herzilya (IL); Anthony J. Li, San Jose, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 13/036,206

(22) Filed: Feb. 28, 2011

(65) Prior Publication Data

US 2012/0221624 A1 Aug. 30, 2012

(51) Int. Cl.
*G01R 31/08* (2006.01)

(52) U.S. Cl.
USPC ........... 370/218; 370/217; 370/242; 370/245; 709/221; 709/239

(58) Field of Classification Search
None
See application file for complete search history.

(56) References Cited

U.S. PATENT DOCUMENTS

| 7,099,286 | B1 | 8/2006 | Swallow |
| 7,428,213 | B2 | 9/2008 | Vasseur et al. |
| 7,558,218 | B1 | 7/2009 | Swallow |
| 7,558,276 | B2 | 7/2009 | Vasseur et al. |
| 7,835,267 | B2 | 11/2010 | Zamfir et al. |
| 8,213,296 | B2 * | 7/2012 | Shannon et al. ............... 370/216 |
| 8,315,159 | B2 * | 11/2012 | Monga et al. .................. 370/222 |
| 2003/0233595 | A1 | 12/2003 | Charny et al. |
| 2006/0250948 | A1 * | 11/2006 | Zamfir et al. ................. 370/216 |

FOREIGN PATENT DOCUMENTS

WO WO 2009138133 A1 * 11/2009

OTHER PUBLICATIONS

D. Papadimitriou et al., draft-many-inference-srlg-02.txt, Inference of Shared Risk Link Groups, Internet Engineering Task Force, Internet Working Group, Nov. 2001, pp. 1-18.

* cited by examiner

*Primary Examiner* — Donald Mills
(74) *Attorney, Agent, or Firm* — Edell, Shapiro & Finnan, LLC (57) ABSTRACT

Diversity constraints with respect to connections or links in a client layer are conveyed to a server layer where those links or connections are served by paths in the server layer. A network device in the server layer stores data associated paths in the server layer with identifiers for connections in the client layer. The network device in the server layer receives from a network device in the client layer a request to set up a path in the server layer for a connection in the client layer. The network device in the server layer receives information describing the diversity requirements associated with connections in the client layer. The server layer network device computes a route in the server layer for the connection specified in the request based on the diversity requirements.

25 Claims, 11 Drawing Sheets

CLIENT DIVERSITY POLICY SHARING WITH THE TRANSPORT LAYER

TECHNICAL FIELD

The present disclosure relates to networking systems and environments.

BACKGROUND

In networking environments that employ an optical network (L0) layer (server layer), the communication of "risk" information between a client network (L3) layer (client layer) and the server layer ensures that a single optical failure does not impair a network device's ability in the client layer to protect traffic around the failure. When switching capabilities are added to the server layer, the risks within the server layer can change over time. Moreover, often, light paths in the server layer need to be re-routed due to maintenance activities and these changes are done in the field by service providers, making it difficult for network operators to stay up to date with these changes. The dynamic nature of the server layer makes it more difficult for the client layer to route traffic around a failure or to maintain desired diversity requirements for a connection.

DESCRIPTION OF EXAMPLE EMBODIMENTS

Overview

Diversity constraints with respect to connections or links in a client layer are conveyed to a server layer where those links or connections are served by paths in the server layer. A network device in the server layer stores data associated paths in the server layer with identifiers for connections in the client layer. The network device in the server layer receives from a network device in the client layer a request to set up a path in the server layer for a connection in the client layer. The network device in the server layer receives information describing the diversity requirements associated with connections in the client layer. The server layer network device computes a route in the server layer for the connection specified in the request based on the diversity requirements.

Example Embodiments

Figure 1:
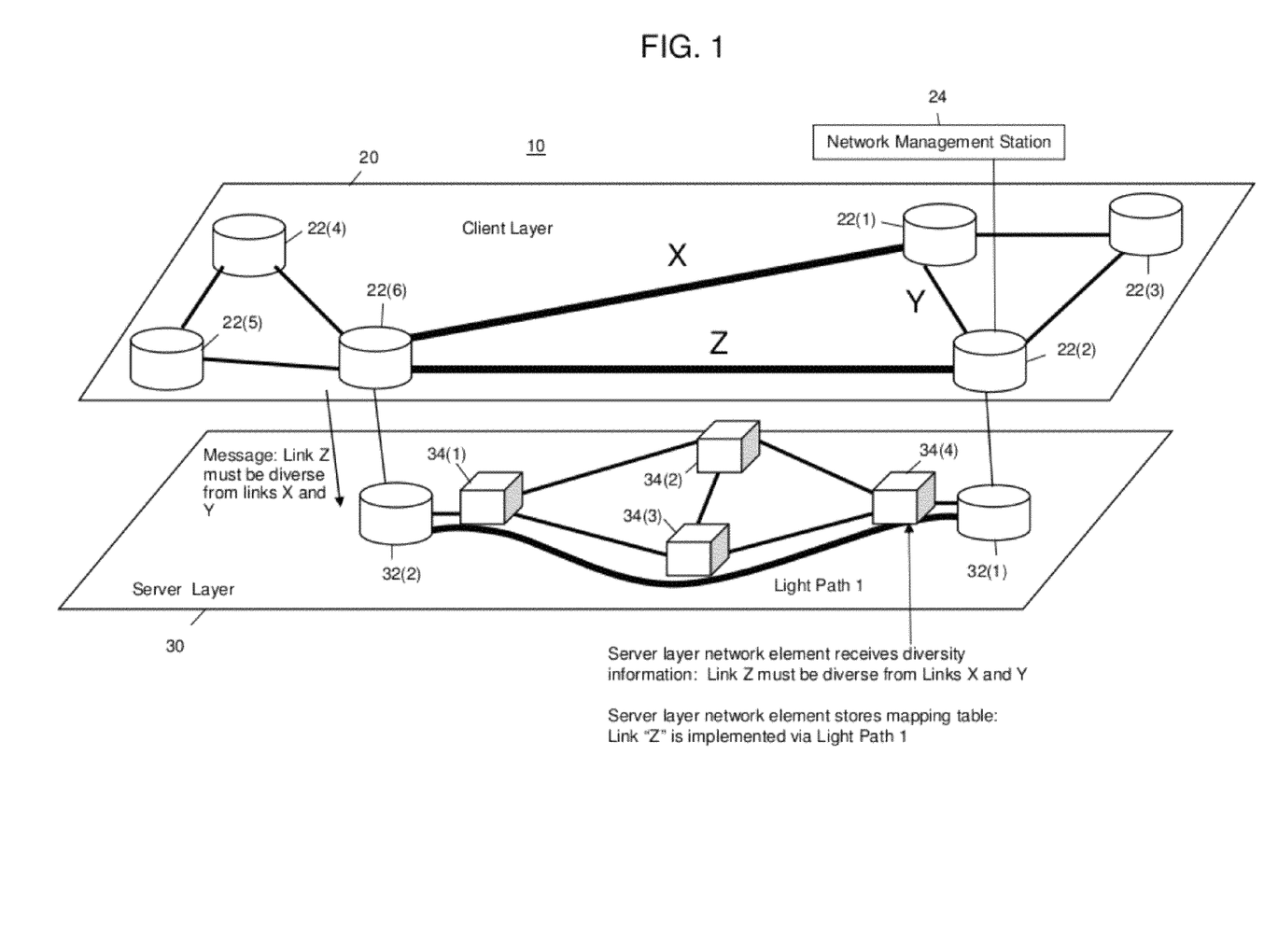
FIG. 1 is a diagram depicting an example of a network environment comprising a client layer and a server layer, where a network device in the client layer conveys diversity requirements information to a network device in the server layer.

Referring first to FIG. 1, a networking environment is shown at 10 comprising a client layer 20 and a server layer 30. In one form, the client layer 20 comprises an Internet Protocol (IP) network and the connections in the client layer are between IP addresses, and the server layer 30 comprises an optical network and the routes in the server layer are light paths. For example, the server layer 30 uses optical dense wavelength division multiplexing (DWDM) transport and routing or Optical Transport Network (OTN) and Synchronous Optical Network (SONET) transport and routing. This is only an example. In another form, the server layer 30 is an Ethernet network and the routes in the server layer are between devices with medium access control (MAC) addresses.

In the client layer 20, there are a plurality of network devices 22(1)-22(6) that perform routing/forwarding operations. Examples of such network devices are Layer 3 (L3) routers, access switches, aggregation switches, etc. FIG. 1 shows six network devices by way of example only and for purposes of describing the techniques herein, and it should be understood that there are many more devices in a network deployment. A network management station 24 is also provided to configure the network devices in the client layer 20 and to provide diversity requirements information, as described further hereinafter.

Similarly, in the server layer 30, there is a plurality of network devices 32(1) and 32(2) and 34(1)-34(4). In one example, these network devices are optical switches, repeaters, add-drop modules, etc. Network devices 32(1) and 32(2) in the server layer 30 are shown with a connection to network devices 22(2) and 22(6), respectively, in the client layer 20. This connection is meant to indicate that information is communicated (in both directions) between the client layer 20 and the server layer 30 at these devices. Moreover, these connections represent communication between a control plane in the client layer 20 and a control plane in the server layer 30 and an eventual data plane connection between the client layer 20 and server layer 30.

Certain network elements in the client layer 20 may be integrated with corresponding network elements in the server layer 30. For example, the client layer control plane intelligence in network element 22(2) in the client layer may be integrated with or configured to communicate over an application programming interface with the server layer control plane intelligence in network element 32(1) in the server layer. The same would hold true for network element 22(6) in the client layer 20 and network element 32(2) in the server layer 30. Thus, the communication between the network devices 22(2) and 22(6) and the network devices 32(1) and 32(2), respectively, in the server layer 30 may be by way of an application programming interface.

Paths between network elements in the server layer 30 may be re-routed for a variety of reasons. For example, light paths are re-routed for maintenance purposes. In addition, optical equipment may fail, thereby destroying a light path until a failover to a protection path can occur. The client layer 20 sends connection requests to the server layer 30 and these requests may involve underlying assumptions as to diversity requirements between the connections the client layer 20 is seeking to be served by the server layer 30. However, when the light paths in the server layer 30 are re-routed, there is no way to know whether the re-routed paths have respected the diversity requirements.

Accordingly, the client layer 20 provides information describing its diversity requirements to the server layer 30, and the server layer 30 performs the routing necessary to comply with the diversity requirements, assuming the conditions in the server layer 30 can accommodate those diversity requirements. There may be situations when the server layer 30 cannot accommodate the diversity requirements of the client layer 20.

For example, as depicted in FIG. 1, network device 22(6) in the client layer sends a message to network device 32(2) in the server layer 30 indicating that Link Z in the client layer 20 needs to be diverse from Links X and Y in the client layer 20. In another example, the diversity requirements may be defined in terms of multiple connections, as described further hereinafter in connection with FIGS. 6-11. The network device 22(6) may derive this diversity information on its own or may receive it from the network management station 24. Network device 32(2) in the server layer 30 receives the diversity information from network device 22(6) in the client layer 20 and generates a light path, e.g., Light Path 1 shown in FIG. 1, for Link Z. In addition, one of the network devices in the server layer 30, e.g., network device 32(1) or 32(2) stores data (e.g., an association or mapping table) that indicates that "Link Z is implemented by Light Path 1", thus associating or mapping a link the client layer 20 with a path in the server layer 30. The link or connection in the client layer 20, e.g., "Link Z," may be represented by IP link names or IP addresses (e.g., IP address of network device 22(6) and IP address of network device 22(2)), and the server layer 30 associates these names or addresses with a path, e.g., an optical path, in the server layer 30. In another form, a link name can be a user-selected name (e.g., "SFO-NYC #1"). The network device 22(2) in the client layer will likewise maintain data for global link names (e.g., X, Y and Z). The network device 22(2) may send the diversity requirements information to the server layer 30 at the time that it sends the connection request for Link Z or any time thereafter. Moreover, the network device 22(2) may send updated diversity requirement information as conditions change in the client layer 20 and the server layer 30 will attempt to accommodate the updated diversity requirements. The interface protocol that the client layer 20 uses to send diversity information to the server 30 is, for example, the User Network Interface (UNI) protocol and it is sent using an application programming interface between the client layer network device and the server layer network device, e.g., between devices 22(6) and 32(2).

The diversity constraints in the client layer 20 may be obtained through any of a variety of means. In one example, a network planning tool executed on the network management station 24 generates the diversity constraints during the network planning process and/or network adjustment phases. In another example, a network device in the client layer 20 knows what needs to be diverse based on working/protection Multiple Protocol Label Switching-Traffic Engineering (MPLS-TE) Fast Re-Route (FRR) tunnels. The MPLS-TE FRR feature allows a network element to obtain link and node protection using the Bidirectional Forwarding Detection (BFD) protocol to provide fast forwarding path failure detection times for all media types, encapsulations, topologies, and routing protocols. In addition to fast forwarding path failure detection, the BFD protocol provides a consistent failure detection method for network administrators. In another example, there is "dual-homing" from an edge network device to a core network device and the diversity constraints are readable available. In still another example, there are two or more links between the same network devices that protect each other and the diversity constraints from such a situation are available. In another example, there is a triangle formed for a Next Hop (NHOP) MPLS-TE FRR tunnel and the diversity constraints are thus available. In yet another example, an IP Fast Reroute loop-free alternate (LFA) computation is performed at a network device in the client layer to provide protection against link failure, in which case locally computed repair paths are used to prevent packet loss caused by loops that occur during network re-convergence after a failure. This LFA computation can therefore reveal diversity constraints in the client layer.

Figure 2:
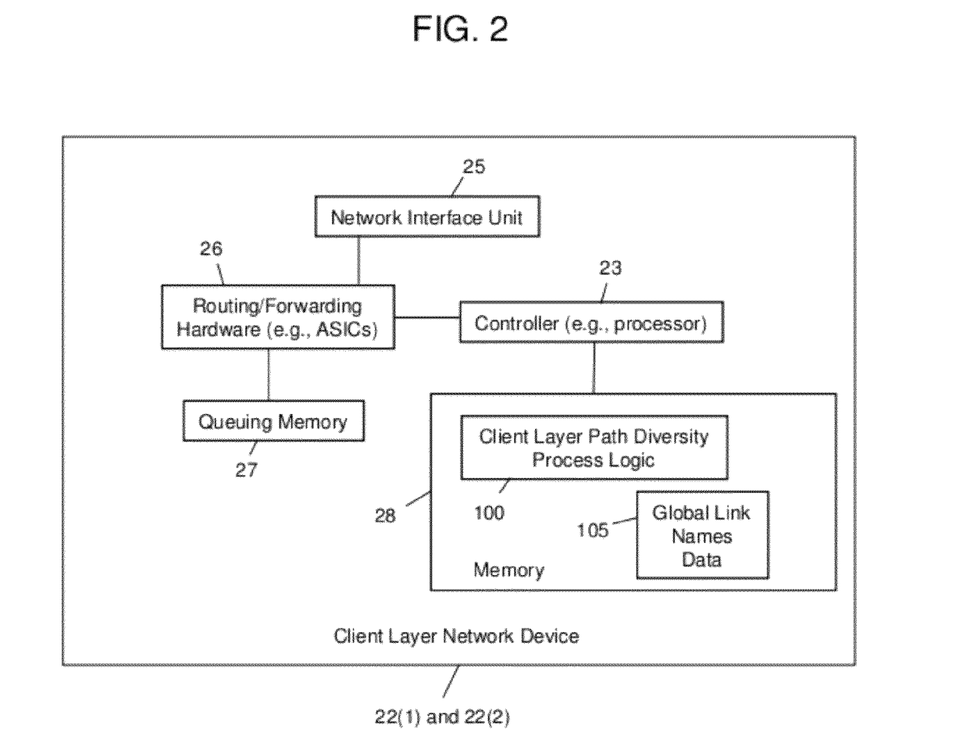
FIG. 2 is a block diagram of an example of a network device in the client layer configured to supply diversity requirements information to the server layer.

Referring now to FIG. 2, a block diagram is shown for an example of a network device in the client layer 20 that is configured to send a connection request and diversity requirements information to the server layer 30. The device depicted in FIG. 2 is, for example, network device 22(1) or network device 22(2) that routes data in the client layer 20 and also communicates with a network device in the server layer 30. The client layer network device comprises a controller 23, a network interface unit 25, routing/forwarding hardware 26, queuing memory 27 and working memory 28. The controller 23 is, for example, a microprocessor or microcontroller, and executes one or more software programs comprising instructions encoded or stored in memory 28, such as instructions for the client layer path diversity process logic 100. The network interface unit 25 is a network interface card or similar device that transmits and receives data using an applicable protocol, e.g., Ethernet or IP, etc. The routing/forwarding hardware 26 is a device that performs the packet forwarding/routing functions in the client layer 20. In one form, the routing/forwarding hardware 26 is implemented with one or more application specific integrated circuits (ASICs). The queuing memory 27 is a memory device, e.g., random access memory (RAM), allocated to store packets that are to be routed/forwarded by the network device.

The working memory 28 is a memory device and may comprise RAM, read only memory (ROM), magnetic disk storage media devices, optical storage media devices, flash memory devices, electrical, optical, or other physical/tangible memory storage devices. Thus, in general, the memory 28 may comprise one or more computer readable storage media (e.g., a memory device) encoded with software comprising computer executable instructions and when the software is executed (by the controller 23) it is operable to perform the operations described herein in connection with process logic 100. The process logic 100 is described hereinafter in connection with FIG. 4. Also stored in memory 28 is data 105 for the global link names of the links that are managed by the network device in the client layer. Examples of global link names are "X," "Y," and "Z" in FIG. 1, and these names may take the form of IP addresses between two points in the client layer, or other identifiers between points in the client layer. The network device uses data 105 when sending a connection request to the server layer 20 and also when specifying diversity requirements to the server layer. In other words, the connection request and diversity requirements information may be expressed in terms of global link names that are contained in a message to the network device in the server layer.

Figure 3:
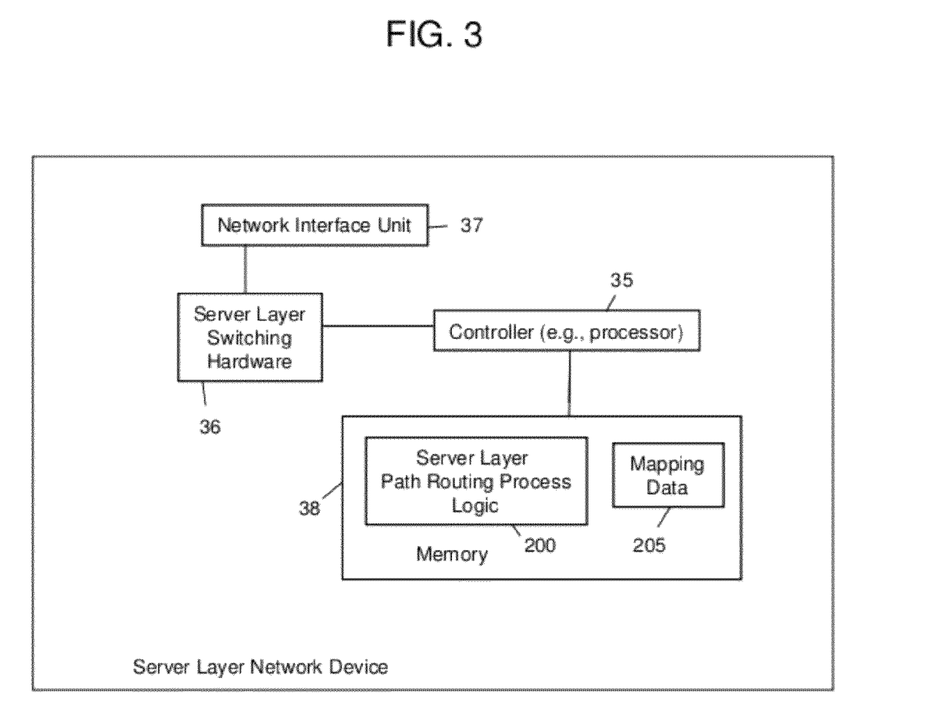
FIG. 3 is a block diagram of an example of a network device in the server layer that is configured to receive the diversity requirements information and to compute a route for a connection request so as to comply with the diversity requirements information.

Reference is now made to FIG. 3 for an example block diagram of a network device in the server layer 30, e.g., network device 32(1) and 32(2) that participates in the diversity policy sharing techniques described herein. The server layer network device comprises a controller 35, server layer switching hardware 36 and a memory device 38. The controller 35 is, for example, a microprocessor or microcontroller, such as that described above in connection with the client layer network device shown in FIG. 2. The server layer switching hardware 36 comprises suitable switching hardware depending on the server layer implementation, e.g., DWDM, SONET, OTN, etc. In one example, the server layer switching hardware comprises an optical switching unit, as well as one or more other optical components such as add-drop modules, cross-connect modules, etc. The network interface unit 37 is a network interface card or suitable device that enables the server layer network device to communicate with the client layer network device for purposes of exchanging messages to enable the diversity policy sharing techniques described herein. The memory 38 may take any of the forms described above for memory device 28 in FIG. 2. The memory 38 stores instructions for server layer path routing process logic 200. The controller 35 executes the instructions for process logic 200 to perform the operations described hereinafter in connection with FIG. 5. In addition, the memory 38 stores mapping data 205 that maps or associates a connection/link identifier (e.g., link name) in the client layer with a path identifier in the server layer. For the example shown in FIG. 1, the mapping data 205 would store data indicating that "Link Z is implemented with Light Path 1." Link Z may be represented by IP addresses for network device 22(6) and 22(2), as explained above.

Figure 4:
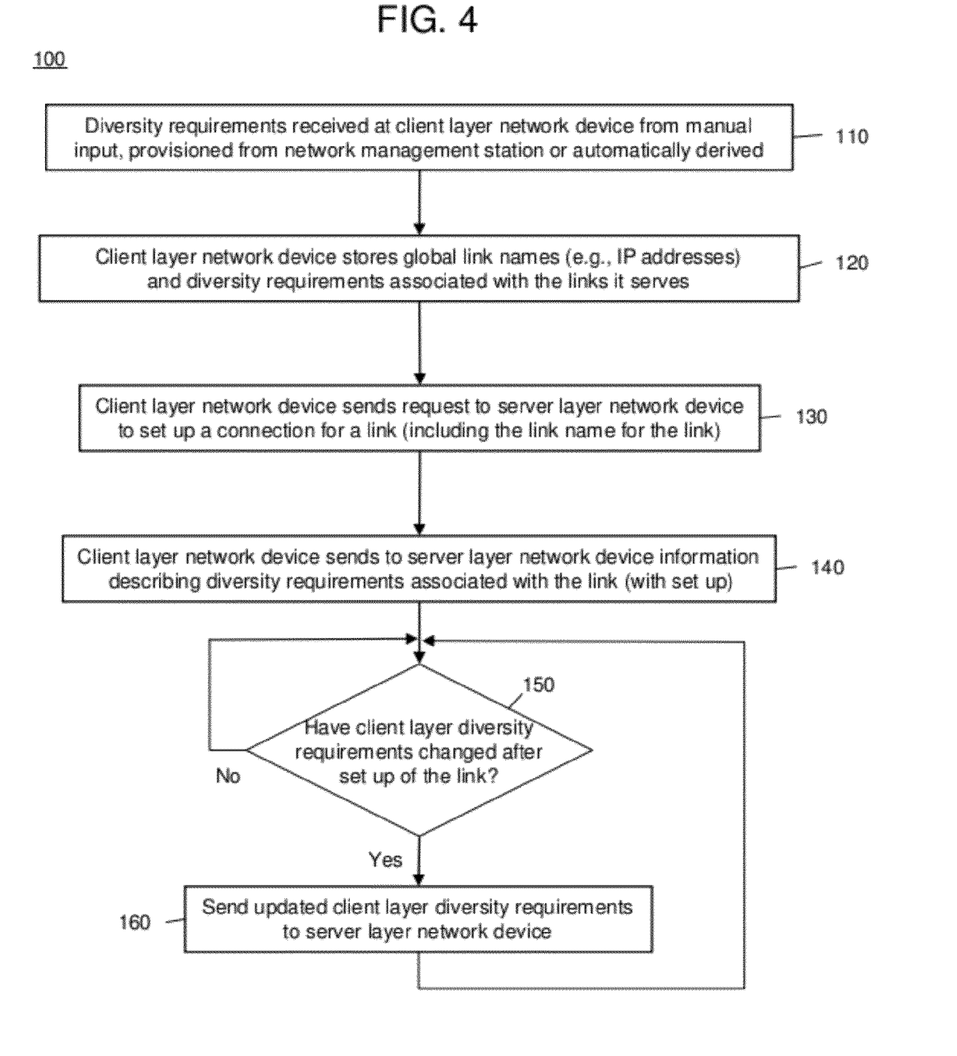
FIG. 4 is a flow chart depicting operations performed in the network device in the client layer to supply diversity requirements information to the optical network layer.

Turning now to FIG. 4, the client layer path diversity process logic 100 is described. The process logic 100 is executed in a client layer network device that is capable of communicating with a server layer network device for diversity policy sharing as depicted in FIG. 1. Reference is also made to FIG. 1 for the description of FIG. 4. At 110, the client layer network device, e.g., network device 22(2) or 22(6) in the example of FIG. 1, receives client layer diversity requirements from manual input, e.g., from a network administrator at network management station 24 or generated by a network planning software tool on the network management station 24. In another form, the client layer network device automatically derives the diversity requirements as described above. At 120, the client layer network device stores data for the global link names (e.g., IP addresses) and data representing the diversity requirements (obtained at 110), as depicted by the data 105 shown in FIG. 2. At 130, the client layer network device sends a message to the server layer network element, e.g., network device 32(1) or 32(2), containing a connection request to set up a connection for a link. The connection request contains the link name for the link, e.g., IP addresses of the devices in the client layer for the link. The connection request may be generated by retrieving a link name from the stored data of link names. At 140, at the same time that the connection request is sent or sometime thereafter (but before the connection is actually set up in the server layer), the client layer network device sends to the server layer network device information describing diversity requirements associated with the link. At this point, the server layer network device can begin implementing a path in the server layer for the link specified in the connection request and in compliance with the diversity requirements.

After the diversity requirements are initially sent at 140, it is determined at 150 whether the client layer diversity requirements have changed. Changes in the client layer due to equipment failures or reconfigurations may result in changes in the diversity requirements. When it is determined that changes have occurred in the client layer diversity requirements, then at 160, the client layer network device sends updated client layer diversity requirements to the server layer network element. Otherwise, the process loops back to operation 150 until and if changes occur in the client layer diversity requirements.

In sum, the flow chart of FIG. 4 depicts a method in which, at a network device in a client layer that comprises a plurality of connections, data is stored identifying the plurality of connections. The network device in the client layer sends to a network device in the server layer a request to set up a path in the server layer for a connection in the client layer. The network device in the client layer sends information describing diversity requirements associated with connections in the client layer.

Figure 5:
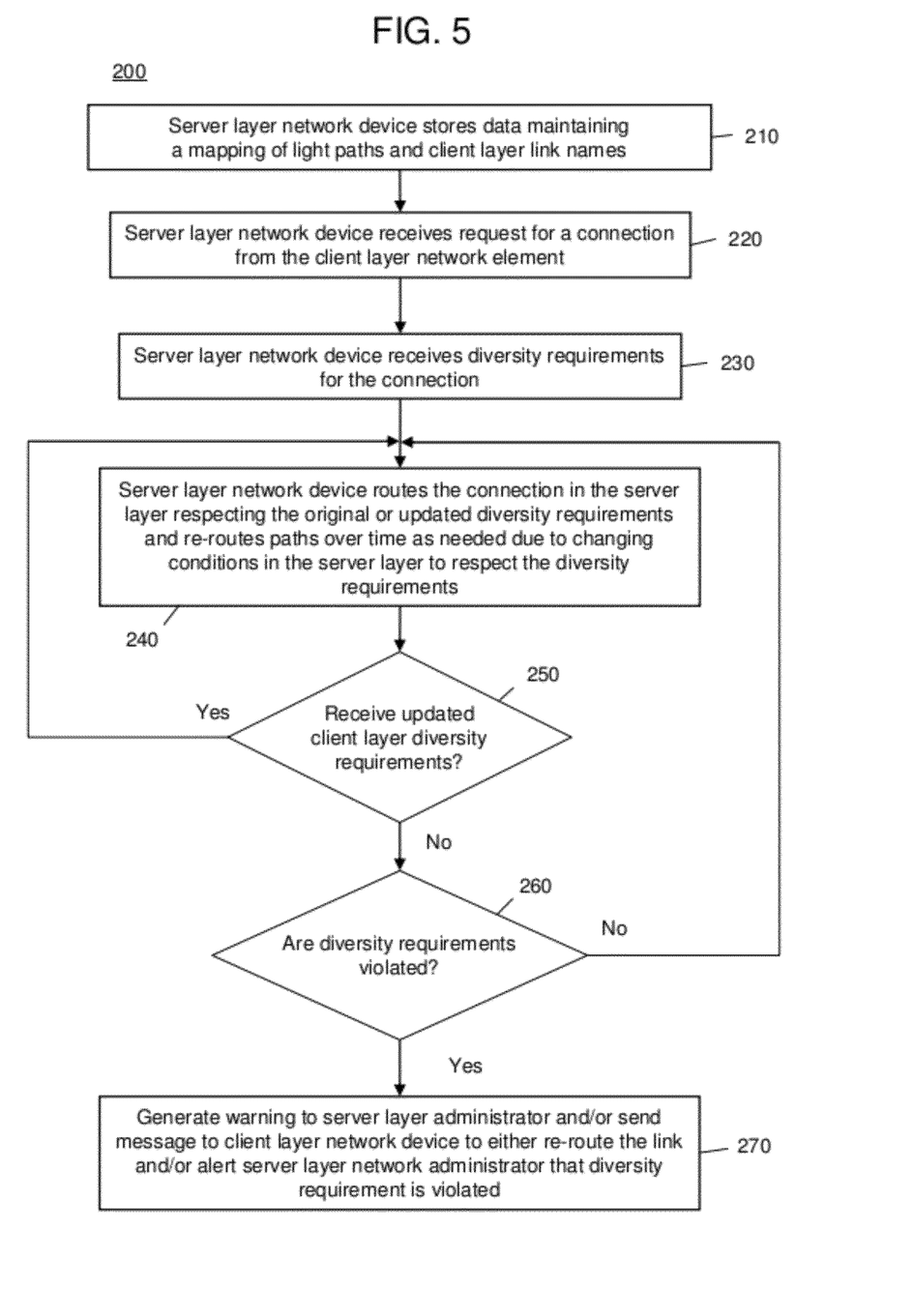
FIG. 5 is a flow chart depicting operations performed in the network device in the server layer to compute a route for a connection request in order to comply with the diversity requirements information.

Reference is now made to FIG. 5 for a description of the server layer path routing process logic 200 executed in a server layer network device, e.g., network element 32(1) and 32(2). The process logic 200 operates in a complementary fashion to the process logic 100 in a client layer network device. At 210, the server layer network device stores data maintaining a mapping or association between paths, e.g., light paths, in the server layer and identifiers for connections in the client layer, e.g., link names. This corresponds to data 205 shown in FIG. 3. At 220, the server layer receives a message containing a connection request from the client layer network device, in response to operation 130 in FIG. 4. At 230, the server layer network device receives the diversity requirements information for the connection, in response to operation 140 in FIG. 4. At 240, the server layer network device computes a route in the server layer for the connection specified in the request in compliance with (i.e., respecting) the original diversity requirements or updated diversity requirements, and routes the connection in a path in the server layer for the connection based on the computed route. In addition, at 240, the server layer network devices updates the path route computations to re-route the path as needed based on changing conditions in the server network layer in order to respect the diversity requirements. Furthermore, as explained hereinafter in connection with the example scenarios of FIGS. 6-11, the route computed in the server layer is based further on shared risk group link data representing paths in the server layer that share connectivity risks.

At 250, it is determined whether the server layer network device receives updated client layer diversity requirements from the client layer. If updated client layer diversity requirements are received, then the path route computations and routing at 240 are repeated based on the updated client layer diversity requirements.

At 260, a determination is made as to whether, based on the routing in the server layer, it is possible to route the connection in the server layer to comply with the diversity requirements, i.e., whether the client layer diversity requirements are violated. A situation may arise in which it is not possible for the server layer to accommodate the client layer diversity requirements. If the diversity requirements cannot be accommodated, then at 270, one or more actions may be performed. For example, a warning message is generated and sent to a server layer network administrator, a message is sent to the client layer network device to re-route the link at the client layer (with perhaps different diversity requirements) and/or a message is sent to alert a client layer network administrator (e.g., at the network management station 24) that the diversity requirements are violated. In general, the warning message can be sent to a network device in the client layer and/or a network device in the server layer when it is determined that the diversity requirements are violated. When it is determined at 260 that the diversity requirements are not violated, then the process goes back to 240.

As explained above in connection with FIGS. 4 and 5, a link diversity policy can be conveyed from the client layer to the server layer as part of a connection request for setting up a link. However, the link diversity policy information can also be sent separately after link set up over a separate application programming interface. When the server layer network device receives the link diversity policy information in a message from the client layer, it conveys the new diversity constraint information along the relevant paths in the server layer.

Thus, in sum, the flow chart of FIG. 5 depicts a method in which diversity constraints with respect to connections or links in a client layer are conveyed to a server layer where those links or connections are served by paths in the server layer. A network device in the server layer stores data associated paths in the server layer with identifiers for connections in the client layer. The network device in the server layer receives from a network device in the client layer a request to set up a path in the server layer for a connection in the client layer. The network device in the server layer receives information describing the diversity requirements associated with connections in the client layer. The server layer network device computes a route in the server layer for the connection specified in the request based on the diversity requirements.

Reference is now made to FIGS. 6-11 for examples of the diversity policy sharing techniques. Beginning first with FIG. 6, a diagram is shown for a network topology comprising links W, X, Y and Z in the client layer and network devices A, B, C and D that bridge between corresponding nodes or points in the client layer and server layer. Links W, X, Y and Z are identified by reference numerals 304, 300, 302 and 306, respectively, and network devices A, B, C and D are denoted 310, 312, 314 and 316. There are intervening nodes in the server layer shown at 320-330. The paths in the server layer pass through the intervening network nodes 320-330 and some of these paths are labeled with reference numerals 332, 334, 336, 338, 340, 342 and 344. For the example network topology shown in FIG. 6, the client layer diversity constraint is that the connections {X,Y} be diverse from the connections {W,Z}. This diversity constraint is passed from the client layer to the server layer during the set up of one of the links W, X, Y and Z or before or after the setup of these links, using a separate application programming interface as explained above. This example of a diversity constraint refers to at least one non-local link. For example, if a connection request is received at network device A 310 for a route to another network device, e.g., network device B 312, the diversity constraint {X,Y} must be diverse from {W,Z} refers to at least one link not local to network device A, e.g., link Z. This is to be distinguished from existing schemes that allow for specifying the diversity constraint only with respect to paths that are local to the two nodes for which the path is to be routed.

Figure 6:
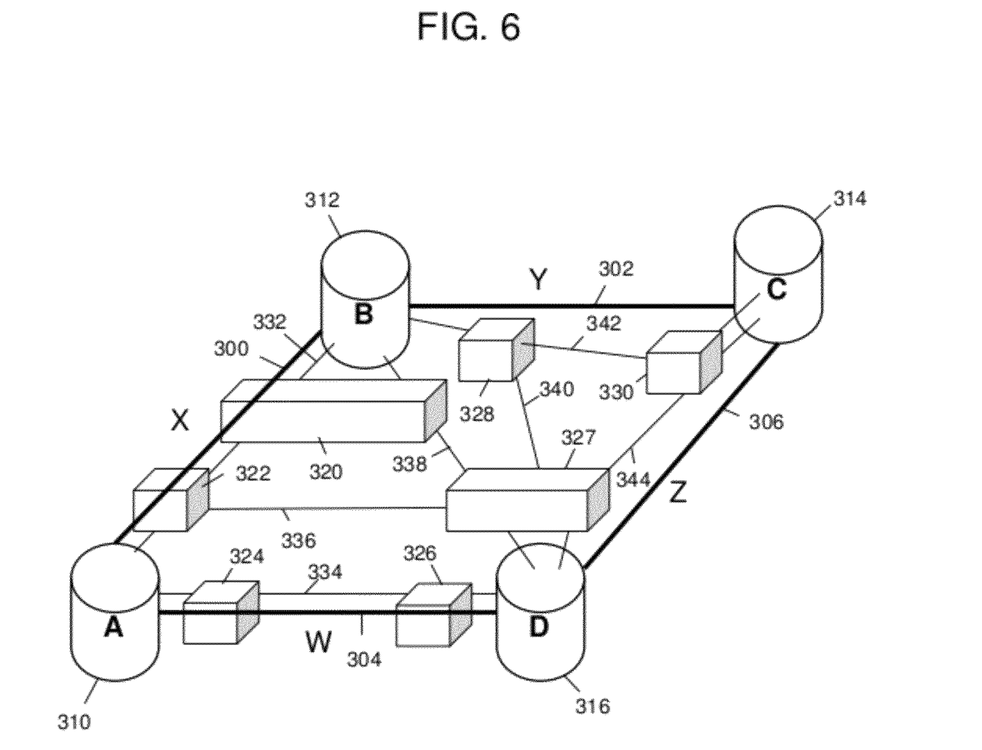
FIGS. 6-11 are diagrams showing routing examples using the techniques described herein.
Figure 7:
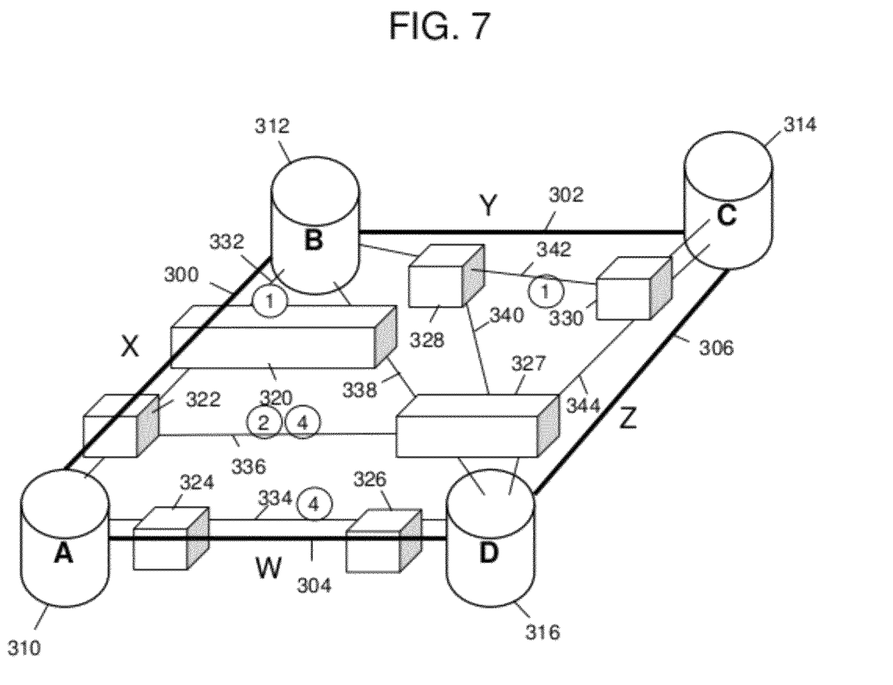

Turning now to FIG. 7, the network topology of FIG. 6 is shown together with shared risk link group data provisioned into the server layer. A shared risk link group is a group of links that share a common fiber or physical attribute such that if one of the links in the group fails, the other links in the group fail. The shared risk link group data is provisioned into the server layer and disseminated by a suitable protocol, such as the Interior Gateway Protocol but is not relayed to the client layer. Alternatively, the shared risk link group for each server layer path (e.g., light path) is disseminated in the server layer. Examples of shared risk link groups (SRLGs) in FIG. 7 are denoted by reference numerals "1", "2" and "4", where SRLG 1 is associated with server layer paths 332 and 342, SRLG 2 is associated with server layer paths 336, and SRLG 4 is associated with server layer paths 334 and 336.

Figure 8:
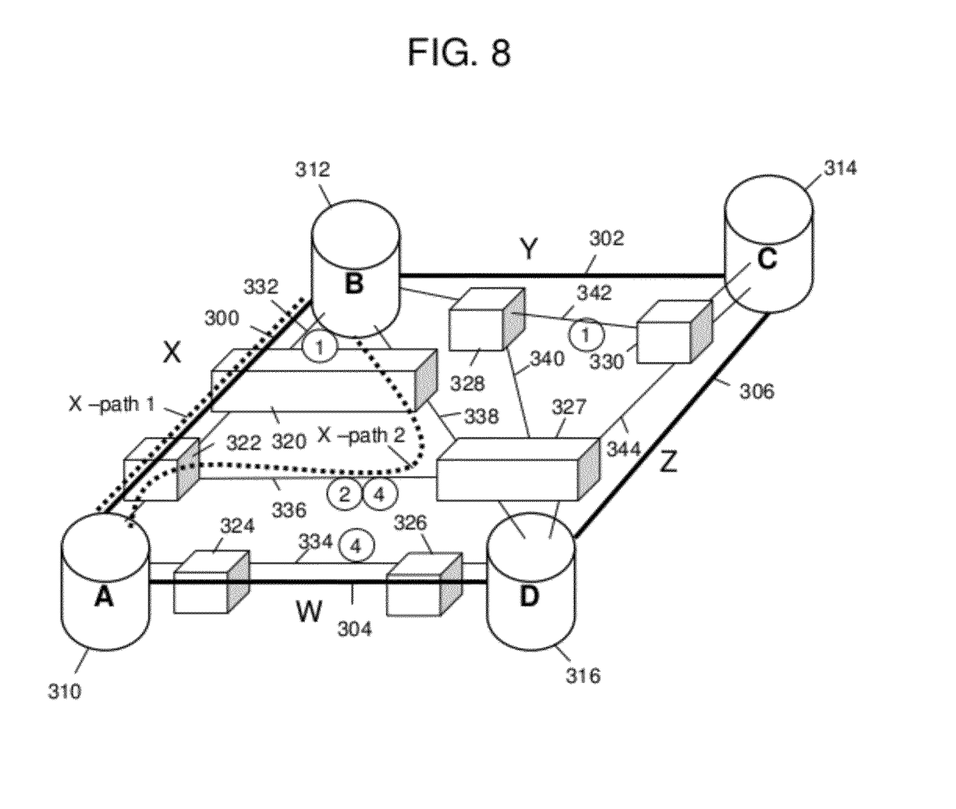

Turning now to FIG. 8, the network topology of FIG. 7 is shown in which network device A 310 sends a connection request to the server layer for the set up of a link to network device B 312, i.e., set up of link X. In this example, there are two possible paths for link X, denoted X-path 1 and X-path 2 in FIG. 8. If the diversity constraints were conveyed to the server layer before the set up request, the server layer would already know that link X must be diverse from both links W and Z. In the optical shared risk link groups, X-path 2 shares shared risk link group "4" with link W and therefore X-path 2, that corresponds to link W, is rejected. The server layer selects X-path 1, i.e., path 332 in the server layer, to comply with the client layer diversity constraints for this example.

Figure 9:
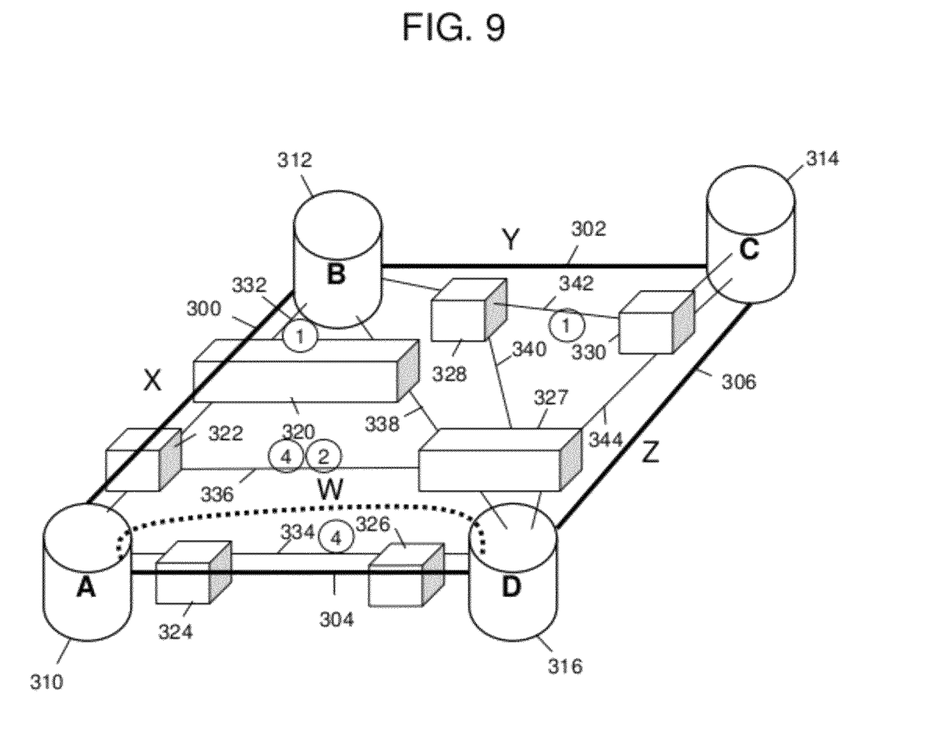

Proceeding to FIG. 9, the scenario of FIG. 8 is continued but now a maintenance activity is performed on link W such that link W is re-routed to a new path, path 336. The server layer checks this new path against the diversity policy received for link X. The server layer will determine that this new path is still diverse from links X and Y (and is also SRLG-diverse from X and Y) and it is accepted.

If, on the other hand, the server layer determines that the new path conflicts with the diversity policy, then the following escalation may take place. A warning message may be sent to the server layer network or system administrator from a server layer network device suitably equipped as described above in connection with FIGS. 3 and 5. If the network administrator decides to proceed despite the warning message about the diversity conflict, an alarm message may be generated in the server layer network device. In another example, the server layer network device sends a message to the client layer network device and ultimately to a network management station (e.g., network management station 24) to report the diversity policy violation. The client layer network device may then initiate a re-route of tunnels to another path (not shown) to protect paths {X, Y} from {W, Z}

Figure 10:
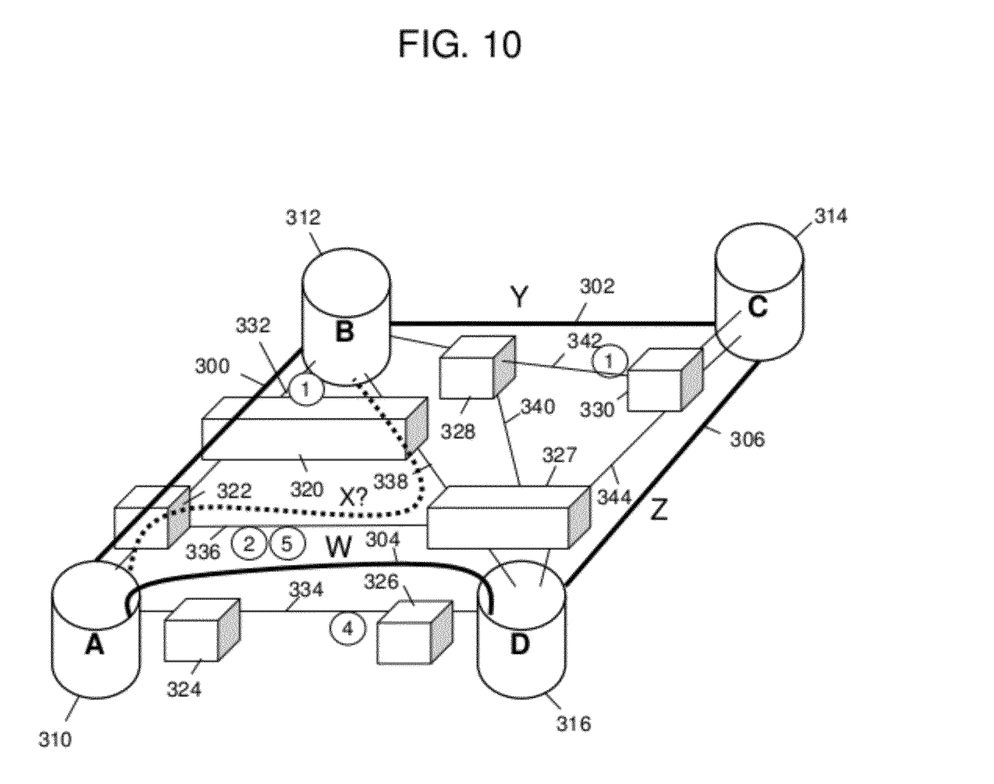

Turning to FIG. 10, the scenario of FIG. 9 is continued in which now the shared risk link group "4" on link W is updated to shared risk link group "5" due, for example, to a fiber being routed over a different physical route. The server layer then needs to determine whether the link X can be routed in the server layer by the path shown by the dotted line in FIG. 10. If shared risk link group information were used to determine whether the server layer could accommodate this update, the server layer would determine that link X could be re-routed as shown in FIG. 10 because the original set up request for link X would have contained the requirement "exclude shared risk link group 4." However, the server layer was provided with the diversity policy information that link X must be diverse from link W, and therefore determines that link X cannot be re-routed on the path as shown in FIG. 10.

Figure 11:
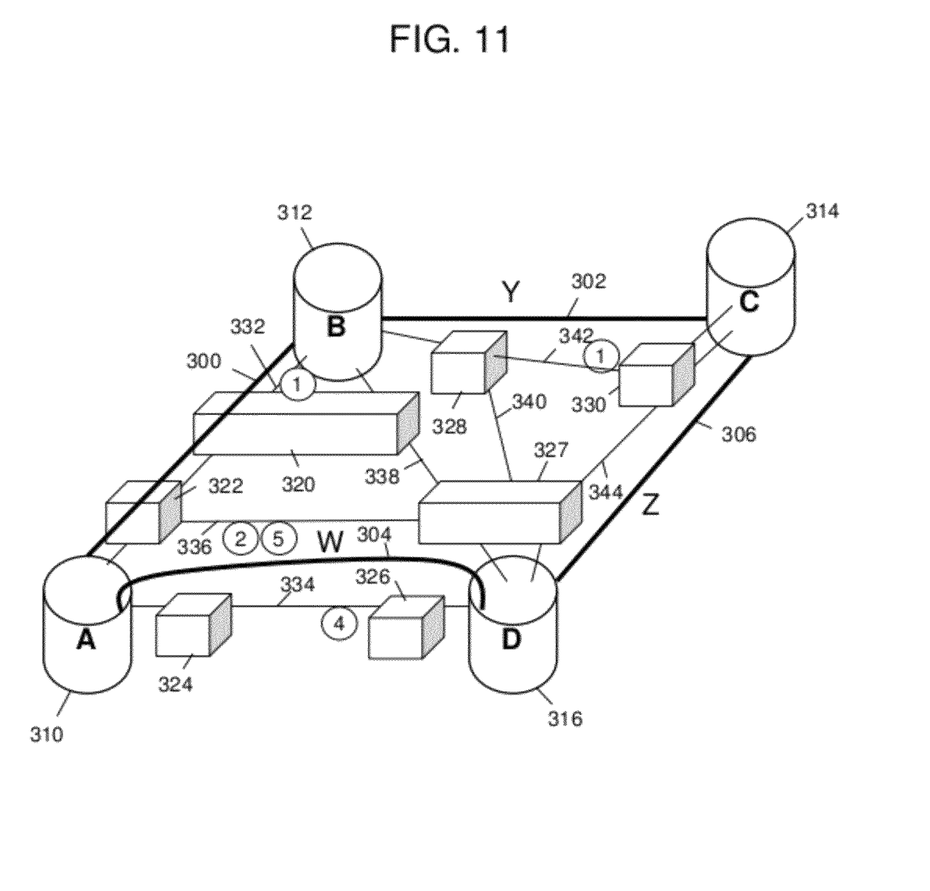

FIG. 11 shows the scenario of FIG. 9 but with the addition of a new constraint added from network device A. The new diversity constraint is that {W,X} must be diverse from {Y,Z}. Thus, in this example, assuming the network device A knows about all of the shared risk link groups and all of the paths in the server layer (or at least about all of the shared risk link groups for each path in the server layer), then network device A can determine whether this new constraint can be respected. In this case, the network element A will determine that the new constraint cannot be respected because both link X and link Y share the shared risk link group "1." Consequently, in response to receiving this new diversity constraint, one or more of the following actions may be taken. An application programming interface response by the server layer network device to the new constraint may include a list of all the violating links, e.g., links X and Y in this case, "Links {X,Y} violate this new diversity request." The server layer network device may generate an alarm message about this violation. The server layer could re-route Links X and/or Y in the server layer to confirm to the diversity constraint. The client layer network device could re-route tunnels so as to avoid the violations.

In summary, techniques are provided herein to allow, upon client layer link set up or at any other point in time, specifying client layer links that must be diverse from the new link (or groups of links/paths that must be diverse from each other), so that the server layer can ensure diversity during the server layer path selection process and maintain this diversity in the presence of rerouting of paths in the server layer.

These techniques maintain the required diversity in the presence of server layer rerouting. Diversity constraints can be tracked at the time of the link setup, and any time thereafter as more links are added or as other changes occur over time in the server layer that may cause violations of the diversity constraints. Subsequent violations of the diversity constraints are reported back to the client layer. According to the techniques described herein, the diversity constraints can refer to at least one non-local link with respect to the network device that receives the connection request. In addition, the amount of data that must be disseminated in the protocol used in the server layer, e.g., the Interior Gateway Protocol is greatly reduced. For example, a few link identifiers are set instead of potentially hundreds of shared risk link groups. Further still, these techniques enable several additional features in the server layer, such as alarming the user if the diversity is not maintained, and signaling to the network device in the client layer to re-route Label Switch Paths in such cases. Moreover, as depicted in the examples of FIGS. 6-11, the diversity constraints can be specified as groups of links that must be pair-wise diverse from each other (reflecting client path diversity constraints—not just link diversity).

The techniques described herein may be embodied by methods as described herein and depicted by the flow charts of FIGS. 4 and 5, and in an apparatus as depicted by the block diagrams of FIGS. 2 and 3, and in computer readable medium storage media encoded with software comprising computer executable instructions. In another form, an apparatus is provided (as depicted in FIG. 3) that comprises routing/forwarding hardware configured to switch data among connections in a client layer; a controller coupled to the routing/forwarding hardware; a memory configured to store data identifying a plurality of connections; wherein the controller is configured to: send to a network device in a server layer a request to set up a path in the server layer for a connection in the client layer; and send to the network device in the server layer information describing diversity requirements associated with the connections in the client layer.

In another form, an apparatus (as depicted in FIG. 4) is provided that comprises switching hardware configured to switch data among paths in a server layer that routes paths for connections in a client layer; a controller coupled to the switching hardware; a memory configured to store data including data associating paths in the server layer with identifiers for connections in the client layer; wherein the controller is configured to: receive a request to set up a path in the server layer for a connection in the client layer; receive information describing diversity requirements associated with connections in the client layer; and compute a route in the server layer for the connection specified in the request based on the diversity requirements.

In still another form, one or more computer readable storage media encoded with software comprising computer executable instructions and when the software is executed operable to: at a network device in a server layer that routes paths in the server layer for connections in a client layer, store data associating paths in the server layer with identifiers for connections in the client layer; and compute a route in the server layer for a connection specified in a request based on information describing diversity requirements associated with connections in the client layer.

The above description is intended by way of example only.

What is claimed is:

1. A method comprising:
at a network device in a server layer that routes paths in the server layer for connections in a client layer, storing data associating paths in the server layer with identifiers for connections in the client layer;
receiving at the network device in the server layer from a network device in the client layer a request to set up a first path and a second path in the server layer that corresponds to a re-routing of a first connection and a second connection in the client layer;
receiving at the network device in the server layer information describing diversity requirements associated with connections in the client layer, wherein the diversity requirements specify that the first connection is to be diverse from the second connection; and
computing routes in the server layer for the first connection and second connection specified in the request based on the diversity requirements, wherein the routes maintain diversity between the first path and the second path to ensure that the re-routing of the first connection and the second connection complies with the diversity requirements.

2. The method of claim 1, wherein the server layer comprises an optical network and the routes in the server layer are light paths, and the client layer comprises an Internet Protocol (IP) network and the connections are between IP addresses.

3. The method of claim 1, wherein the server layer is an Ethernet network and the routes in the server layer are between devices with medium access control (MAC) addresses, and the client layer comprises an Internet Protocol (IP) network and the connections are between IP addresses.

4. The method of claim 1, wherein computing comprises updating route computations based on changing conditions in the server layer.

5. The method of claim 1, and further comprising at the network device in the client layer, receiving the information describing the diversity requirements from manual user input or from a client network management station.

6. The method of claim 1, and further comprising deriving the diversity requirements at the network device in the client layer.

7. The method of claim 1, and further comprising at the network device in the client layer, storing data for a plurality of link names for connections in the client layer, and generating the request by retrieving the link name from the stored data of link names, and wherein storing at the network device in the server layer comprises storing an association of paths in the server layer with link names in the client layer.

8. The method of claim 1, and further comprising at the network device in the client layer, generating updated information for the diversity requirements and sending the updated information to the network device in the server layer.

9. The method of claim 1, and further comprising determining whether it is possible to route the connection in the server layer to comply with the diversity requirements.

10. The method of claim 9, and further comprising generating a warning message to be sent to a network device in the client layer when it is determined that the diversity requirements are violated.

11. The method of claim 1, wherein receiving the information describing the diversity requirements comprises receiving information indicating diversity with respect to paths comprised of multiple links, wherein at least one of the multiple links is non-local.

12. The method of claim 1, and further comprising computing routes in the server layer based further on shared risk link group data representing paths in the server layer that share connectivity risks.

13. The method of claim 1, and further comprising routing the first and second connections based on the computed route.

14. A method comprising:
at a network device in a client layer that comprises a plurality of connections, storing data identifying the plurality of connections;
sending to a network device in a server layer a request to set up a first path and a second path in the server layer that corresponds to a re-routing of a first connection and a second connection in the client layer; and
sending to the network device in the server layer information describing diversity requirements associated with connections in the client layer, wherein the diversity requirements specify that the first connection is to be diverse from the second connection.

15. The method of claim 14, and further comprising receiving the information describing the diversity requirements from manual user input or from a client network management station.

16. The method of claim 14, and further comprising deriving the information for the diversity requirements at the network device in the client layer.

17. The method of claim 14, wherein storing comprises storing data for a plurality of link names for connections in the client layer, and further comprising generating the request by retrieving a link name from the stored data of link names.

18. The method of claim 14, and further comprising at the network device in the client layer, generating updated information for the diversity requirements and sending the updated information to the network device in the server layer.

19. An apparatus comprising:
switching hardware configured to switch data among paths in a server layer that routes paths for connections in a client layer;
a controller coupled to the switching hardware;
a memory configured to store data including data associating paths in the server layer with identifiers for connections in the client layer;
wherein the controller is configured to:
receive a request to set up a first path and a second path in the server layer that corresponds to a re-routing of a first connection and a second connection in the client layer;
receive information describing diversity requirements associated with connections in the client layer, wherein the diversity requirements specify that the first connection is to be diverse from the second connection; and
compute routes in the server layer for the first connection and second connection specified in the request based on the diversity requirements, wherein the routes maintain diversity between the first path and the second path to ensure that the re-routing of the first connection and the second connection complies with the diversity requirements.

20. The apparatus of claim 19, wherein the controller is further configured to update route computations based on changing conditions in the server layer.

21. The apparatus of claim 19, wherein the controller is further configured to generate a warning message to be sent to a network device in the client layer when it is determined that the diversity requirements cannot be complied with by the route computations in the server layer.

22. The apparatus of claim 19, wherein the controller is configured to compute routes in the server layer based further on shared risk link group data representing paths in the server layer that share connectivity risks.

23. One or more non-transitory computer readable storage media encoded with software comprising computer executable instructions and when the software is executed operable to:
at a network device in a server layer that routes paths in the server layer for connections in a client layer, store data associating a first path and a second path in the server layer with identifiers corresponding to a first connection and a second connection in the client layer; and
compute routes in the server layer for the first connection and second connection specified in a request based on information describing diversity requirements associated with connections in the client layer, wherein the routes maintain diversity between the first path and the second path to ensure that re-routing of the first connection and the second connection complies with the diversity requirements.

24. The computer readable storage media of claim 23, and further comprising instructions operable to update route computations based on changing conditions in the server layer.

25. The computer readable storage media of claim 23, and further comprising instructions that are operable to generate a warning message to be sent to a network device in the client layer when it is determined that the diversity requirements cannot be complied with by the route computations in the server layer.

* * * * *